United States Patent [19]
Denker et al.

[11] Patent Number: 5,572,628
[45] Date of Patent: Nov. 5, 1996

[54] TRAINING SYSTEM FOR NEURAL NETWORKS

[75] Inventors: John S. Denker, Leonardo; Yann A. LeCun, Lincroft; Patrice Y. Simard, Eatontown, all of N.J.; Bernard Victorri, Paris, France

[73] Assignee: Lucent Technologies Inc., Murray Hill, N.J.

[21] Appl. No.: 308,069

[22] Filed: Sep. 16, 1994

[51] Int. Cl.$^6$ ........................... G06K 9/62
[52] U.S. Cl. .......................... 395/23; 395/22; 395/20
[58] Field of Search ..................... 395/22, 23, 20

[56] References Cited

U.S. PATENT DOCUMENTS

| | | | |
|---|---|---|---|
| 5,058,179 | 10/1991 | Denker et al. | 395/22 |
| 5,067,164 | 11/1991 | Denker et al. | 395/22 |
| 5,239,594 | 8/1993 | Yoda | 395/23 |
| 5,251,268 | 10/1993 | Colley et al. | 395/23 |
| 5,337,371 | 8/1994 | Sato et al. | 382/14 |
| 5,479,575 | 12/1995 | Yoda | 395/22 |

*Primary Examiner*—George B. Davis
*Attorney, Agent, or Firm*—Martin I. Finston; Charles E. Graves

[57] ABSTRACT

In order for neural network technology to make useful determinations of the identity of letters and numbers that are processed in real time at a postal service sorting center, it is necessary for the neural network to "learn" to recognize accurately the many shapes and sizes in which each letter or number are formed on the address surface of the envelope by postal service users. It has been realized that accuracy in the recognition of many letters and numbers is not appreciably sacrificed if the neural network is instructed to identify those characteristics of each letter or number which are in the category "invariant." Then, rather than requiring the neural network to recognize all gradations of shape, location, size, etc. of the identified invariant characteristic, a generalized and bounded description of the invariant segments is used which requires far less inputting of sample data and less processing of information relating to an unknown letter or number.

1 Claim, 9 Drawing Sheets

Original

Generators +  +

Diagonal translation =

TRAINING SYSTEM FOR NEURAL NETWORKS

GOVERNMENT INTEREST

This invention was funded under a government contract (No. 104230-90-C-2456) awarded by the United States Postal Service.

FIELD OF THE INVENTION

This invention relates to learning machines and, particularly, to a novel method for training an artificial neural network to be insensitive to specific transformations of its input.

BACKGROUND OF THE INVENTION

Many pattern recognition machines have a built-in capability to adapt their useful output on the basis of "training data." One such system is the adaptive neural network, which is finding increasing use in character and speech recognition applications. An example of this type of system is described in U.S. Pat. No. 5,067,164, issued Nov. 19, 1991, to J. S. Denker et al., and assigned to Applicants' assignee. This patent application is hereby incorporated by reference herein in its entirety.

Workers in the art of pattern recognition have recognized that in training the neural network it is useful to take into account a characteristic of patterns known as "invariance." The term "invariance" as used herein refers to the invariance of the nature of a pattern to a human observer, with respect to some transformation of that pattern. For instance, the nature of the image of a "3" pattern is invariant by translation, which is a linear displacement of the image. That is, translating the image does not change the meaning of the image to a human observer. On the other hand, the nature of the image of a "6" is not invariant by a rotation of 180 degrees: to a human observer it becomes a "9." To the same observer, however, a small rotation of the upright "6" image does not change the meaning of the image.

A desirable property of a pattern recognizing machine is that its output be invariant with respect to some specific transformation of its input. In the case of alphanumeric patterns, the possible transformations include: translation, rotation, scaling, hyperbolic deformations, line thickness changes, grey-level changes, and others.

In many systems in which the processing machine adaptively "learns," it is useful to input not only raw training data but also some amount of high-level information about the invariances of the training data input patterns. In automated alphanumeric character recognition, for example, the answer generated by the classifier machine should be invariant with respect to small spatial distortions of the input images (translations, rotations, scale changes, etc.). In speech recognition systems, the system should be invariant to slight time distortions or pitch shifts.

A particular example of such a system is a neural network-based machine for making accurate classifications as to the identity of letters and numbers in the address block of envelopes being processed at a postal service sorting center. Here, it is necessary that the neural network be trained to recognize accurately the many shapes and sizes in which each letter or number are formed on the envelope by postal service users.

Given an unlimited amount of training data and training time, this type of system could learn the relevant invariances from the data alone, but this is often infeasible. On the other hand, having limited amount of input data for the learning process can also degrade the accuracy of recognition.

This latter limitation is addressed by the prior art by using artificial data that consists of various distortions (translations, rotations, scalings . . . ) of the original data. This procedure, called the "distortion model," allows the statistical inference process to learn to distinguish the noise from the signal. This model is described in an article "Document Image Defect Models" by Henry Baird, published in *IAPR 1990 Workshop on Sytactic and Structural Pattern Recognition* (1990). Unfortunately, if the distortions are small, the learning procedure makes little use of the additional information provided by the distorted pattern. The reason is that the information contained in the difference between the two patterns is masked by the information they have in common. Learning is therefore prohibitively slow. If the distortions are made larger however, the learning performance can also go down, due to the fact that the database pattern distribution no longer reflects the distribution which the system must perform on.

Another approach found in the prior art to overcome this limitation is to incorporate into the training procedure some general invariances without specifying the specific transformations (rotation, translation, etc.) of the input which will leave the output invariant. This procedure is exemplified by the "weight decay" model described in the article "Learning Internal Representations by Error Propagation," published in *Parallel Distributed Processing, Volume* 1 (1987), by D. E. Rumelhart, G. E. Hinton, and R. J. Williams. It attempts to decrease the network sensitivity to all variations of the network input. One problem with the results obtained with this model, however, is a lack of realism. While invariance with respect to a few specific transformations does not compromise correct output classification, it is also true that invariance with respect to a transformation, which to the human observer makes the transformed letter look like another, will result in incorrect classification of one of the two letters. This lack of selectivity is a well-known limitation of the "weight decay" and like models.

The factors of training time, correctness, and limitations on available data therefore are not yet satisfactorily addressed and remain an issue in the use of neural networks to recognize handwritten script in the address box of envelopes. Training obviously cannot be conducted using the total universe of letters/numbers on envelopes that flow through the Postal Service. To train instead on samples of these requires typically many thousands of samples of training data to teach a network to distinguish useful information from noise. Further, a training session for a neural network can take days or weeks in order to make the best use of the training data available. As to results, in the best of circumstances in prior art machines, modern neural network classifiers seldom perform better than to achieve after training approximately 95 percent correct classifications on uncleaned handwritten digit databases.

Basically, therefore, having to convey useful information about the database by enumerating thousands of sample patterns to the learning procedure, is a primary inefficiency of the prior art.

Accordingly, one object of the invention is to build recognition databases more efficiently.

Another object of the invention is to incorporate into a neural network training database new and useful instructions as to how the input data may be transformed.

A specific object of the invention is to automatically recognize handwritten alphanumeric script more rapidly and at the same time more accurately in real time.

SUMMARY OF THE INVENTION

In simplest terms, the invention is a new and useful way to describe the pattern classes to be recognized, and teaches a training algorithm which uses this descriptive information to train a neural network which then may be used in the automated recognition of handwritten script.

According to the invention, the speed and accuracy of the process by which a neural network is trained to correctly recognize symbols, such as alphanumeric symbols is appreciably enhanced by a neural network input-output training system in which the operators that generate the invariances as to each given training input are approximated.

One way to appreciate the invention as applied to alphanumeric symbols is to consider that the invariance of a pattern p, such as the number "3," with respect to a group T of transformations of the pattern "3," can be interpreted as the set S of all the patterns which can be obtained from the pattern "3" by the transformation of the group T. This set is typically a non-linear many-dimensional surface in a even higher dimensional space. In practice, the surface cannot be expressed analytically; that is, it cannot be represented as a useful mathematical function which has a solution which a neural network machine can process. The invention provides a way around this problem.

Specifically, in accordance with the invention, the tangent plane to the many-dimensional surface at the data point, p, can be expressed analytically, and is a useful approximation of the complex surface, at least in the neighborhood of the point p, which is the neighborhood of interest in the art of automated alphanumeric recognition.

The tangent plane has the further advantage of being completely specified by a few vectors. For example, if the surface is n dimensional, exactly n vectors are necessary to describe the tangent plane. For the set of transformations consisting of all the possible translations of 2-dimensional images such as alphanumeric symbols, for example, two vectors are needed to completely describe the tangent plane.

Another aspect of the invention is the formalism by which the invariances are identified to the neural network. Applicants have realized the applicability of Lie Group theory to construct and express the desired small transformations. Thus, the small transformations of interest are expressed "locally" by a process in which the derivative of the transformed image with respect to the parameter that controls the transformation is calculated. This directional derivative, also called "Lie derivative," then is used as the generator of interest in the machine. These generators themselves can be incorporated into the neural network learning process, to create a machine with a substantially enhanced capability to classify alphanumeric symbols.

As will be shown in the detailed description to follow, substantial efficiencies in the learning process are thereby gained over the prior art process of cycling the neural network through multiple supplementary points of the input symbol data. By extending the learning process to a process which can also learns the directional derivative of the function to be learned, higher order properties of the trained network can be achieved.

Importantly, the invention permits any desired number of possible invariances to be included in any particular training process. The greater number of invariances can relatively easily be expressed by tangent vectors, and has the advantage of introducing more knowledge about the classes to be recognized. The invention thus can be seen to be applicable to fields beyond alphanumeric symbol recognition, such as speech pattern recognition and robotic controls.

The invention and its further objects, features and advantages will be more fully appreciated from a reading of the detailed description to follow.

DETAILED DESCRIPTION OF AN ILLUSTRATIVE EMBODIMENT

Figure 1:
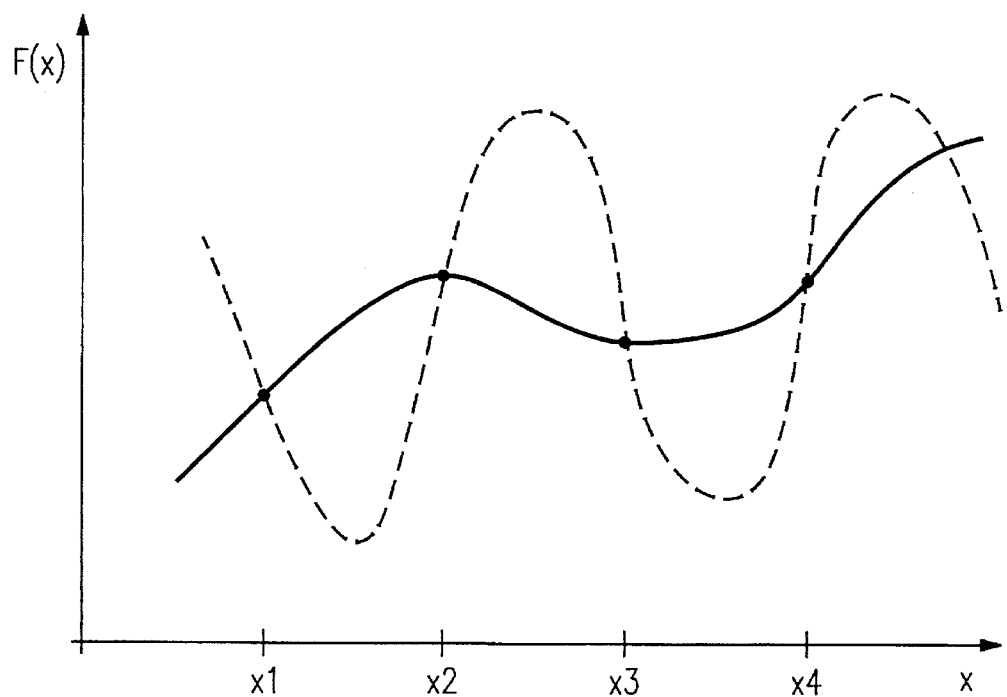
FIG. 1 is a graph illustrating two functions going through four data points which may be alphanumeric images.

FIG. 1 illustrates, in a somewhat simplified example, the advantage of using information about derivatives when using neural network machines to learn a function of one variable. In this case, the input is one dimensional and the directional derivative is the same in all directions. Of course in the case of a function with two input variables, the curve would become a surface, and the derivative (slope) at a point would depend on the direction used to evaluate it. In FIG. 1, the solid curve represents the function F to be learned, and the pairs $(x_1, F(x_1))$ to $(x_4, F(x_4))$ are the only information available to the learning machine.

From the figure it is easy to see that even if the algorithm is completely successful in learning all the patterns, the learned function (dotted line) can be quite different from the desired function (solid line). This is due to the fact that no information about F is available on points situated between the training points. This problem can be partly solved by providing more information at the training points.

Figure 2:
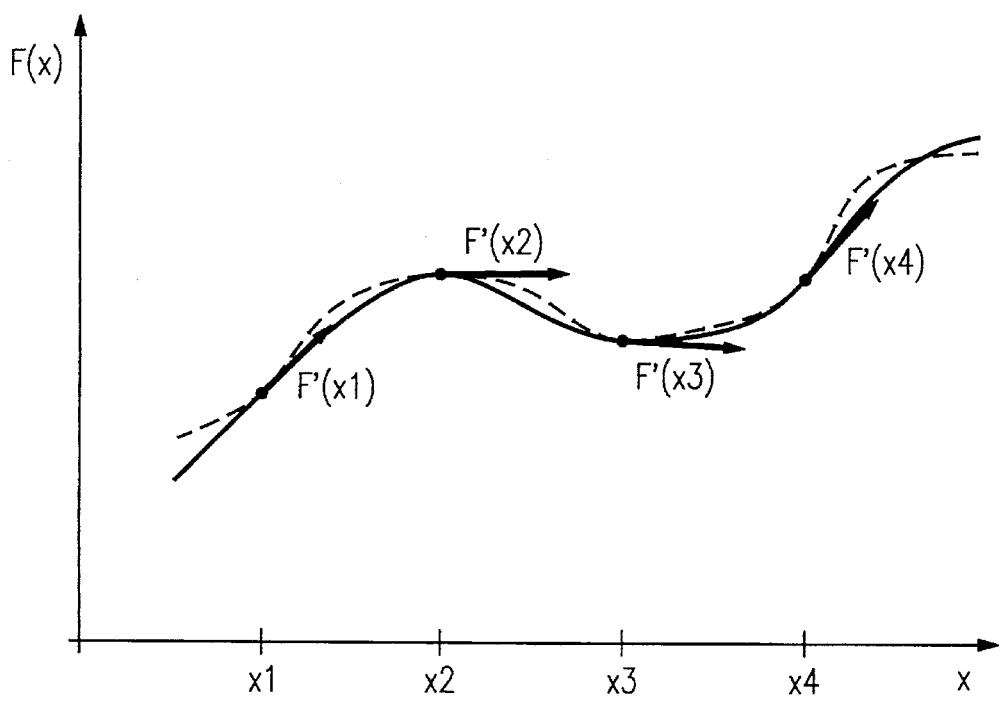
FIG. 2 is a graph similar to FIG. 1 illustrating the concept of tangent vectors.

The solution proposed here is to specify, for each training point, not only the value of the function to be learned, but also its derivatives. The overall objective function minimized by the learning process measures the discrepancy between F and the learned function at the training points, as well as the discrepancy between the derivatives of F and their desired value. The result is a much better approximation of F. This is illustrated in FIG. 2 (dotted line). Although it is not the case in the figure, the points at which the derivative is specified may differ from the points at which the value is specified.

This problem becomes harder to visualize if the function F depends on multiple variables. In this case there exist different derivatives with respect to each variable, and combination of variables. In the case of a function of two variables (for instance $F(u_1, u_2)$), the derivative of F with respect to $u_1$, differs from the derivative of F with respect to $u_2$. In the former case the computing is the directional derivative in the direction of the $u_1$ axis, characterized by the vector (1,0). In the latter case the computing is the directional derivative of F in the direction of the $u_2$ axis, also characterized by the vector (0,1). If the input $(u_1, u_2)$ is modified by changing $u_1$ and $u_2$ by the same small amount, that is, by following the direction (1,1), the corresponding variation of F can be computed by simply evaluating the corresponding directional derivative.

The solution described above can still be applied using directional derivatives: for each training point, the value of the function is specified, as well as the values of its derivatives along certain well chosen directions (possibly all of them). The overall objective function now measures the discrepancy between F and the learned function at the training points, as well as the discrepancy between the derivatives of F along certain directions and their desired value.

A common problem in machine learning is to learn a function which is known a priori to be invariant with respect to a set of transformations. Transforming an input vector through a small transformation in the set is equivalent to adding a small vector T to the input vector. If the transformation is sufficiently small, the amount by which a function F changes when its input is changed through this small transformation, is equal (to first order) to the directional derivative of F in the direction of T times the norm of T. If the goal is to make the machine locally invariant with respect to this transformation, the desired value of the derivative along the direction of the transformation is simply set to zero. The directions along which the derivative is specified are the directions of all the transformations with respect to which the system is to be locally invariant.

Hereafter the directional derivative of F with respect to direction T at point U will be written $F'_T(U)$. The invention will be explained first by showing how useful information about the data can be expressed via directional derivatives. Thereafter, their application in training a network will be explained in connection with applications in the field of neural networks adapted to classification tasks.

TANGENT VECTORS

Specifying the derivatives of the function to be learned in certain directions can be viewed as providing high-order information to the learning system. This becomes especially interesting when the derivatives in some directions are known apriori.

For example, in many cases the function to be learned is known to be locally invariant with respect to a set of locally differentiable transformations. In other words, it may be known that the value of F at point U and at a point near U, obtained by applying a small transformation to U, must be equal.

In this case, the set of all patterns obtained by applying transformations of the set (or combinations thereof) to U is a differentiable manifold that contains U. The hyperplane tangent to the manifold at U is called the tangent plane. This plane can be described by a set of (non-unique) basis vectors called the tangent vectors, which can be computed as explained below.

Once the tangent vectors $T_i$ are known, stating the invariance of F at U by the set of transformations considered is equivalent to stating that the directional derivative $F'_{T_i}(U)$ along each tangent vector $T_i$ is equal to 0. Following is a description of the procedure to compute the tangent vectors.

The first step is to parameterize the set of transformations. This means that all the transformations of pattern U can be obtained from U and some parameter $\alpha$ (possibly multidimensional) by computing a function $s(\alpha, U)$. Some reasonable restrictions are made on s, in particular $s(0, U)=U$ should hold, and s should be differentiable with respect to $\alpha$ and U. This latter restriction can require some processing of the data. For instance in the case where the transformations are rotations of digital images, values between pixels of the original image U must be interpolated in order to compute the rotated image. Typical schemes are smooth interpolation function such as convolution, cubic spline etc. The dimension of the parameter $\alpha$ depends on the complexity of the transformation space considered.

Figure 3:
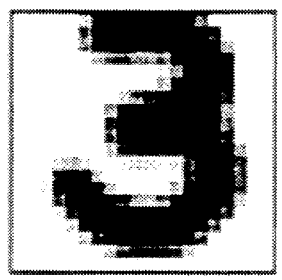
FIGS. 3 and 4 are pixel chart-equations depicting the creation of tangent vector images.
Figure 3:
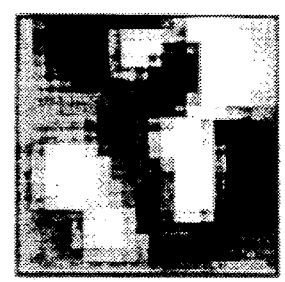

A simple illustration of the tangent vector when the input is a 16×16 pixel image is provided in FIG. 3 where a particular transformation of the number "3," a "rotational transformation," is achieved. An original pixel image denoted U, is used to construct a further image denoted $s(\alpha, U)$, differing from the original in that it has undergone rotations by an angle $\alpha$. As noted in FIG. 3, the tangent vector is defined as the (original image U minus the rotated image $s(\alpha, U)$) divided by $\alpha$. A resulting pixel image, denoted T, is thereby created and is one of the desired generators, or tangent vectors. The operation minus, plus, and scalar multiplication are defined to be pixel value by pixel value subtraction, addition, and multiplication by a scalar. In the Lie group formalism, the limit of the the tangent vector when $\alpha$ tends to 0 is called the Lie derivative and is noted $\partial s(\alpha, U)/\partial \alpha$.

Figure 4:
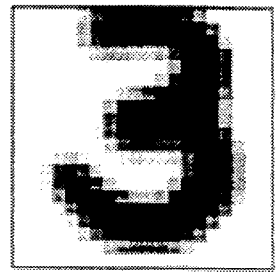
Figure 4:
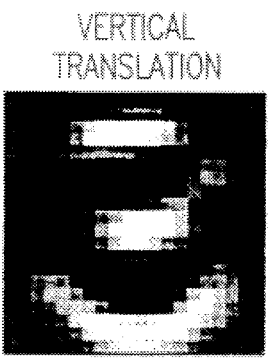
Figure 4:
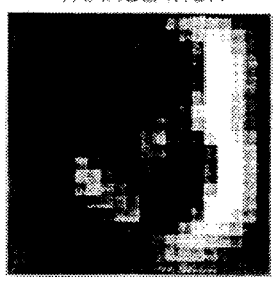
Figure 4:
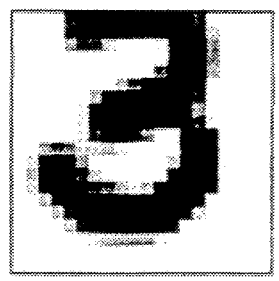
Figure 5:
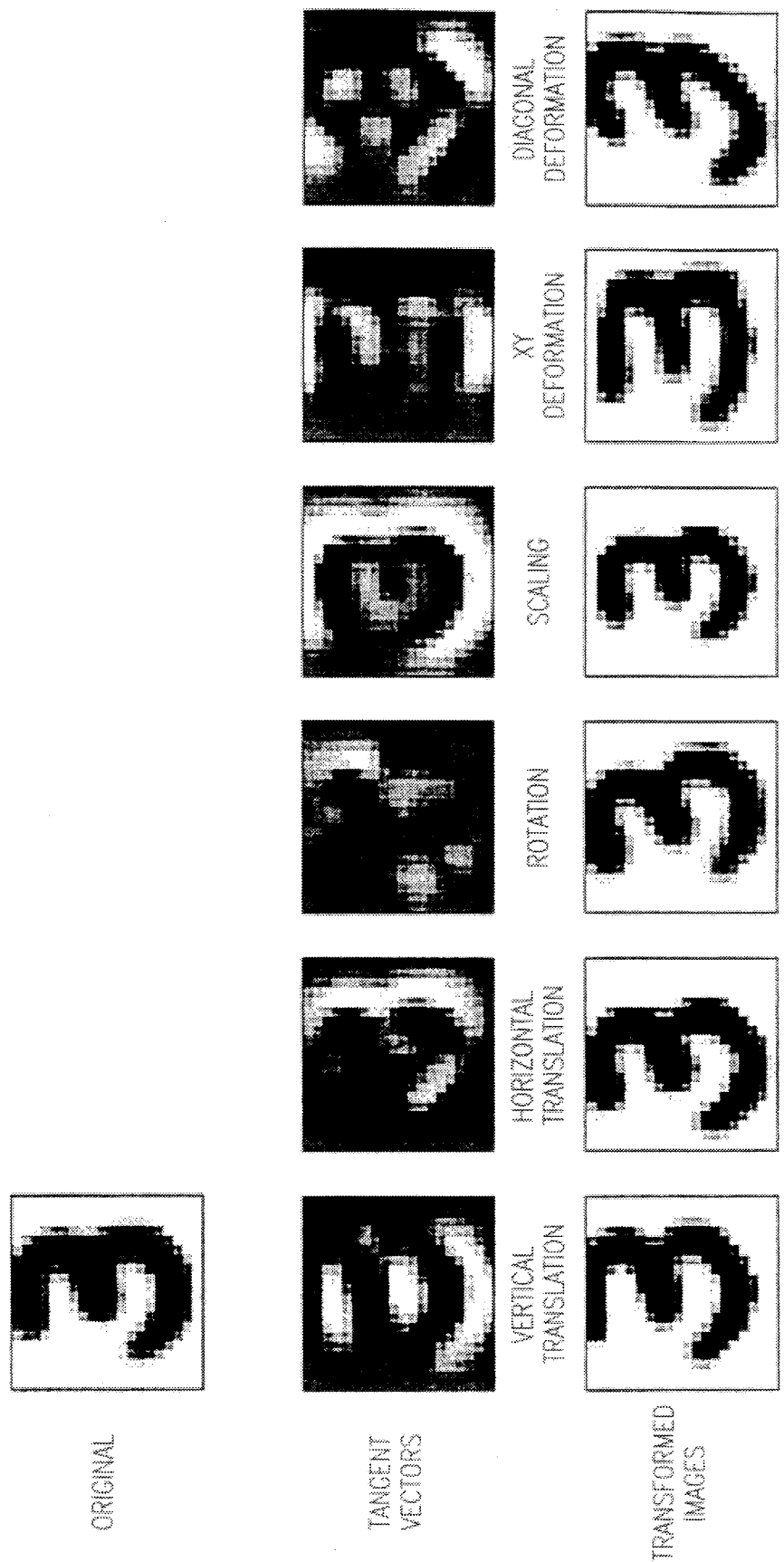
FIG. 5 is a multi-pixel chart showing the effect in pixel-screen format of various transformations of an illustrative symbol.

To further illustrate why only a few tangent vectors completely specify the whole tangent plane, FIG. 4 shows how the generators for horizontal and vertical translations can be used to generate diagonal translations. The generators for vertical and horizontal translations are obtained in a way similar to the rotation described above. To obtain a diagonal translation from the tangent vectors, it suffices to linearly combine the tangent vectors corresponding to the horizontal and vertical translations of the original image. FIG. 5 shows six tangent vectors, which generate a tangent plane of dimension 6. These six transformations can generate any linear coordinate transformation in the plane. Rotation of any center can be obtained by combining rotation and translation; skewing of any direction can be obtained by combining deformation, rotation and scaling, etc.

Figure 6:
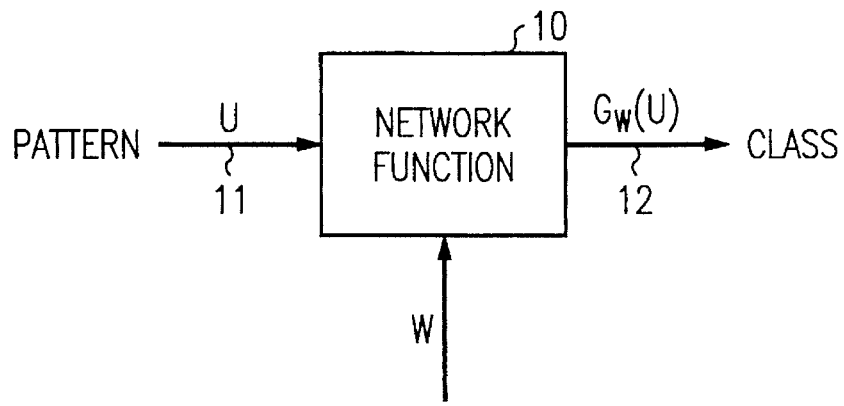
FIG. 6 is an input-output diagram showing the basic function of an adjustable neural network.
Figure 7:
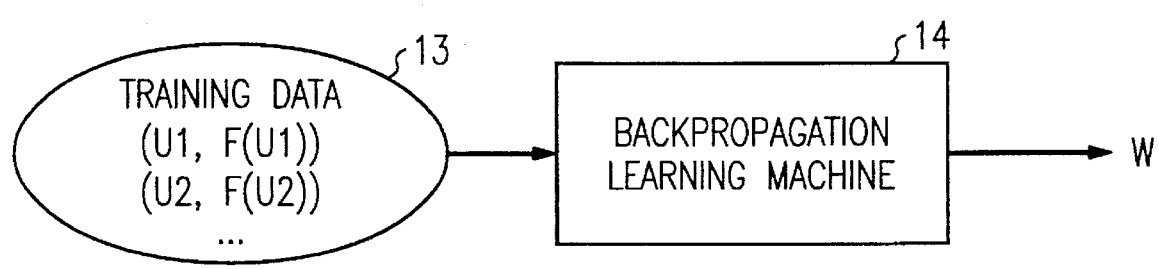
FIG. 7 is a high-level input-output diagram of a back-propagation neural network learning machine being trained on input patterns.

In order to appreciate the present invention, it is useful to return briefly to the prior art as exemplified by the cited patent application of Denker et al. This patent describes a neural network for classification of handwritten digits. In its operation mode, depicted in FIG. 6, a pattern U is presented as an input 11 to the network 10, which computes an output $G_w(U)$ denoted 12 as a function of a set of parameters W that have been computed during training. The training procedure consists of using a preexisting database consisting of pattern-label $(U_p, F(U_p))$ pairs to adjust a set of parameters W, also called weights, for the network. The arrangement shown in FIG. 7 uses training data 13 to train a backpropagation neural network 14 to generate the set of parameters W. The training procedure is fully described in the earlier-cited literature and patent application.

Figure 8:
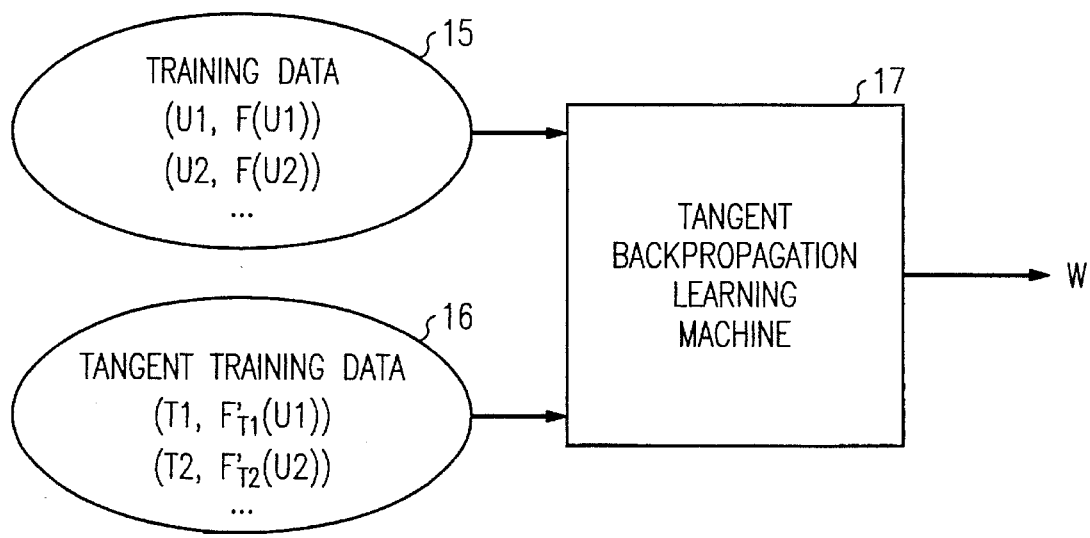
FIG. 8 is a high-level input-output diagram of a back-propagation neural network machine in which both "tangent" data and original input pattern data are used to train.

The present invention is in part a new training procedure which uses an augmented database $(U_p, F(U_p), T_p, F'_{T_p}(U_p))$ denoted as inputs 15 and 16 to convey information to a neural network learning machine 17 about the directional derivatives of F. In these quadruplets, $T_p$ is a direction in input space and $F'_{T_p}(U_p)$ is the value of the derivative of F along that direction at point $U_p$. The new training procedure illustrated in FIG. 8 makes use of the additional information in the form of tangent vector training data to find better values for the set of parameters W. The terms used above will be more fully described hereinafter.

The invention applies to any class of learning function $G_w(U)$, as long as G is differentiable with respect to U and W. Nevertheless, the invention is particularly interesting when applied to the prior art learning algorithm known as "the backpropagation algorithm," depicted for comparison purposes in FIG. 9. The training procedure is to present pairs $(U_p, F(U_p))$ as inputs 18 to the system, which adjusts its set of parameters W in order to minimize the error between the learned function and the desired function at the patterns.

The network function module 19 represents a particular function conventionally computed by a multilayered backpropagation network as can be found in the literature. As workers in the art will appreciate, the unit function equation is written.

$$a_i^l = \sum_j w_{ij}^l x_j^{l-1} \quad (1)$$

$$x_i^l = \sigma(a_i^l) \quad (2)$$

where $w_{ij}^l$ is the weight of the connection going from unit j in layer l−1 to unit i in layer l, $x_i^l$ is the activation of unit i in layer l, $x_j^{l-1}$ is the activation of unit j in layer l−1, $a_i^l$ is the net input of unit i in layer l, and σ is a differentiable function. The pattern index p is dropped for clarity in the above equations. At the input layer (l=0) the activations are set to the input pattern, i.e. $x_i^0 = u_{p,i}$, which is the input of the module. The output of the module $G_w(U_p)$ is the activation of the last layer (l=L), that is $x_i^L$ for all i.

Figure 9:
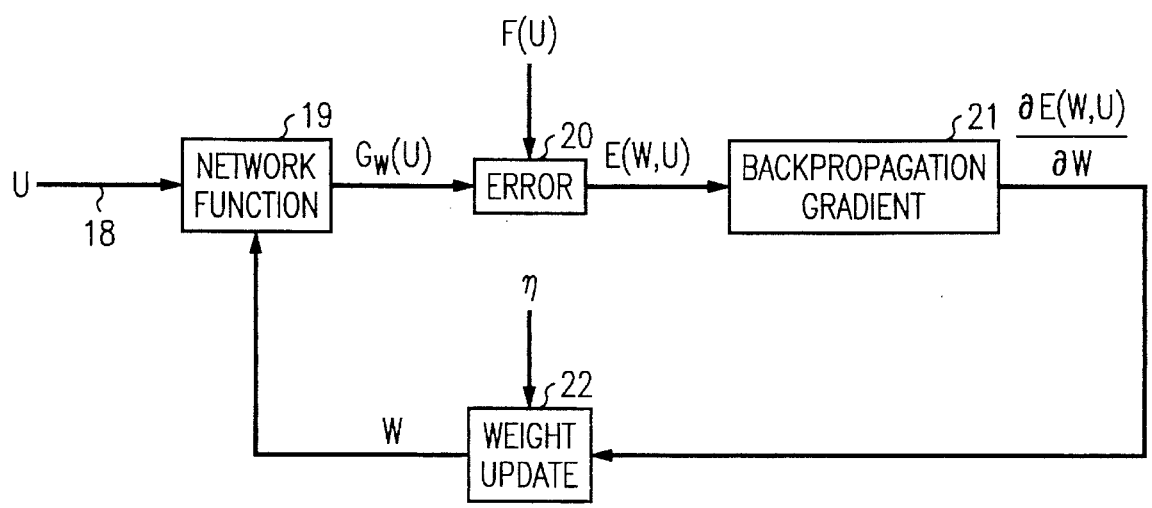
FIG. 9 is a functional block diagram of a conventional backpropagation neural network, showing the process of training.

The error module 20 of FIG. 9 computes a cost function. It is usually of the form $$E(W, U_p) = \frac{1}{2} \| G_w(U_p) - F(U_p) \|^2 \quad (3)$$

where $G_w(U_p)$ is the output of the network 19 when presented pattern p, or in other words, the values of the $x_i^L$'s on the output layer.

The backpropagation gradient module 21 computes the function $\partial E(W, U_p)/\partial W$ which is fully described in the Rumelhart paper cited earlier. Again, the equations of the backpropagation algorithm are given for further reference, $$b_i^l = \sum_k w_{ki}^{l+1} y_k^{l+1} \quad (4)$$

$$y_i^l = \sigma'(a_i^l) b_i^l \quad (5)$$

where $b_i^l$ is the derivative of E with respect to the state $x_i^l$ of unit i in layer l, $y_i^l$ is the derivative of E with respect to the net input $\alpha_i^l$ of the same unit, and $\sigma'(\alpha_i^l)$ is the the derivative of σ at point $\alpha_i^l$. At the output layer L, $y_i^L = \sigma'(\alpha_i^L)(x_i^L - F(U_p)_i)$. The output of the gradient module 21 is equal to $$\frac{\partial E(W, U_p)}{\partial w_{ij}^l} = y_i^l x_j^{l-1} \quad (6)$$

for all l, i, and j. The network function module 19 and the backpropagation gradient module 21 are tightly coupled as the presence of $a_i^l$ in equation 4 indicates.

The weight update module 22 computes new value of W (the set of all the parameters $w_{ij}^l$) after each iteration of the loop in the diagram. The equation is typically of the form $$w_{ij}^l(t+1) = w_{ij}^l(t) - \eta \frac{\partial E(W, U_p)}{\partial w_{ij}^l} \quad (7)$$

where η is the learning rate, and t is an iteration index which represents time. The output of the module 22 is the new value of each weight, and will be used by the network function module 19 at the next iteration.

The learning process can be summarized by a succession of the following iterations, for each pattern $U_p$: first, set the activations of the first layer to the pattern $U_p$ in order to compute the activation $x_i^l$ of each unit according to equations 1 and 2. This is achieved in network function module 19. Next, compute the error according to equation 3 in error module 20. Then, compute the unit gradient $y_i^l$ of each unit, and the weight gradient $\partial E(W, U_p)/\partial w_{ij}^l$ of each weight according to equations 4 and 6 in backpropagation gradient module 21. Finally update each weights according to equation 7 in weight update module 22. The process is repeated by cycling several times through all the patterns, until the error reaches an acceptable level.

In the prior art just described above, there is no provision for incorporating information to restrict $G'_w(U)$, the derivative of the network function, in some chosen directions. The invention provides a solution to this problem, as will be seen below.

Figure 10:
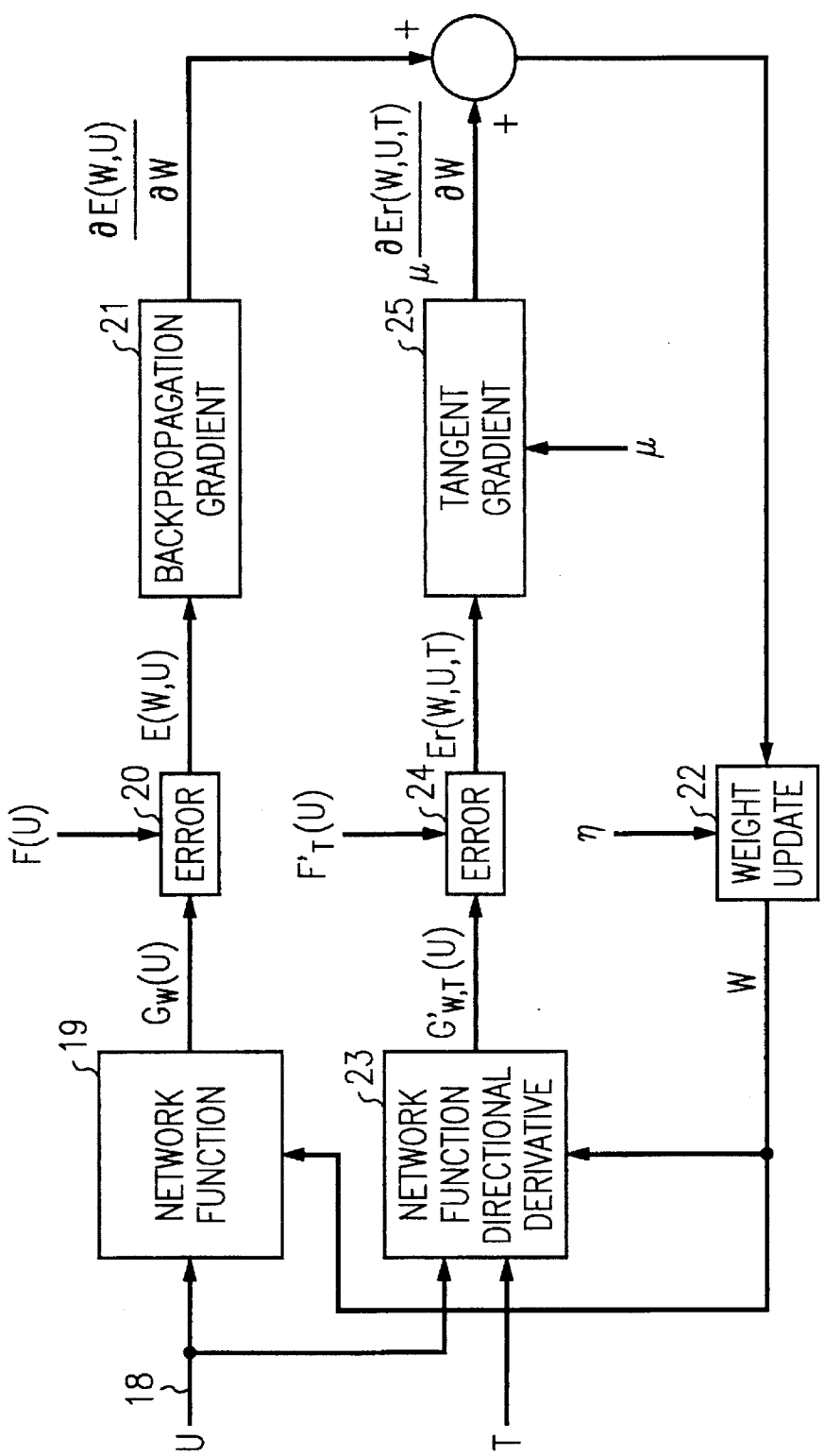
FIGS. 10 and 11 are functional block diagrams of back-propagation neural network machines illustrating applications of the present invention.

The invention may be carried out in the apparatus shown in FIG. 10. The top and bottom part of the diagram are identical to the apparatus shown in FIG. 9, as indicated by common components and nomenclature. Three new functionalities in the machine compute how the set of parameters W changes to incorporate constraints on the directional derivatives. The first module, a network function directional derivative generator 23, computes the network function directional derivatives in a way similar to equation 1. Because of this similarity, similar notations are used (the roman symbols a and x are replaced by their Greek equivalents α and ξ):

$$\alpha_i^l = \sum_j w_{ij}^l \xi_j^{l-1} \quad (8)$$

$$\xi_i^l = \sigma'(a_i^l) \alpha_i^l \quad (9)$$

$\xi_i^l$ is the tangent activation of unit i in layer l, and $\alpha_i^l$ is the tangent net input thereof. At the input layer the tangent activation is set to the input tangent vector, i.e. $\xi_i^l = t_{p,i}$.

The output of the module is the set of tangent activations of the output layer, $\xi_i^L$. Equation 8 is similar to equation 1 and can be carried out by the same units.

The network function directional derivative module 23 is connected to another error module 24, and is a similar cost function to the error module described in FIG. 9.

The tangent gradient module 25 receives the output of module 24, and computes the function $\partial E_r(W, U, T)/\partial W$, where U is the input pattern, and T is the tangent vector. First, module 25 computes the units tangent gradients, which are the derivatives of $E_r$ with respect to the $\xi_i^l$'s and the $\alpha_i^l$'s. The equation is similar to equation 4 (and again the roman symbols b and y are replaced by the Greek equivalents β and ψ):

$$\beta_i^l = \sum_k w_{ki}^{l+1} \psi_k^{l+1} \quad (10)$$

$$\psi_i^l = \sigma'(a_i^l)\beta_i^l \quad (11)$$

where $\beta_i^l$ is the derivative of $E_r$ with respect to the tangent state $\xi_i^l$ of unit i in layer l, $\psi_i^l$ is the derivative of $E_r$ with respect to the tangent net input $\alpha_i^l$ of the same unit. At the output layer L, $\psi_i^L = \sigma'(a_i^L)(\xi_i^L - F'_T(U_p)_i)$.

Because in general the network function module 19 is non-linear, additional terms need to be calculated:

$$c_i^l = \sum_k w_{ki}^{l+1} z_k^{l+1} \quad (12)$$

$$z_i^l = \sigma'(a_i^l)c_i^l + \sigma''(a_i^l)\alpha_i^l\beta_i^l \quad (13)$$

where $\sigma''(a_i^l)$ is the second derivative of $\sigma$ at point $a_i^l$. At the output layer L, $z_i^L = \sigma'(a_i^L)(x_i^L - F(U_p)_i)$ for all i.

As seen in FIG. 10, the output of the tangent gradient module 25 is equal to $\mu$ times $$\frac{\partial E_r(W, U_p, T_p)}{\partial w_{ij}^l} = x_j^{l-1} z_i^l + \xi_j^{l-1} \psi_i^l \quad (14)$$

where $\mu$ is a learning coefficient which determines the importance of $E_r(W, U_p, T_p)$ relative to $E(W, U_p)$. For $\mu=0$, the algorithms of FIGS. 9 and 10 are identical.

The implementation of the above set of equations can be optimized by merging the calculations of the b, y, c and z (equations 4 and 12) into a single operation, effectively replacing the two gradient modules in FIG. 10 by a single one:

$$b_i^l = \sum_k w_{ki}^{l+1} y_k^{l+1} \quad (15)$$

$$y_i^l = \sigma'(a_i^l)b_i^l + \sigma''(a_i^l)\alpha_i^l\beta_i^l \quad (16)$$

with L, $y_i^L = \sigma'(a_i^L)(x_i^L - F(U_p)_i)$ at the output layer. With this simplification, the gradient of $E + \mu E_r$ with respect to the weights is simply $$\frac{\partial [E(W, U_p) + \mu E_r(W, U_p, T_p)]}{\partial w_{ij}^l} = x_j^{l-1} y_i^l + \mu \xi_j^{l-1} \psi_i^l \quad (17)$$

The learning process of the invention as described above and as depicted in FIG. 10, can be summarized by a succession of the following iterations, for each input pattern $U_p$: first, compute the net inputs $a_i^l$ and activations $x_i^l$ of each unit for pattern $U_p$ according to equation 1 in network function module 19. Second, compute the tangent net inputs $\alpha_i^l$ and activation $\xi_i^l$ according to equation 8 in network function directional derivative module 23, followed by computing of values, the error in the two error modules 20, 24.

Then compute the tangent gradient $\beta_i^l$ and $\psi_i^l$ in tangent gradient module 25 and the gradients $b_i^l$ and $y_i^l$ in the backpropagation gradient module 21 according to equations 10 and 15.

Finally, compute the sum of the two weight gradients according to equation 17 and update the weights with $$w_{ij}^l(t+1) = w_{ij}^l(t) - \eta \frac{\partial E(W, U_p) + \mu E_r(W, U_p, T_p)}{\partial w_{ij}^l} \quad (18)$$

The process can be repeated by cycling several times through all the patterns, until both errors $E(W, U_p)$ and $E_r(W, U_p, T_p)$ reach an acceptable level.

The above-described computational steps may be practiced by simulation on most general purpose computers, such as a SPARC Workstation.

Alternatively, customized neural network chips may be built to incorporate the modules 19, 20, 21, 22, 23, 24, and 25 seen in FIG. 10.

The above set of equations can be generalized to other types (i.e. non neural network) of $G_w(U)$ functions. It suffices for G to be differentiable with respect to U and W.

Figure 11:
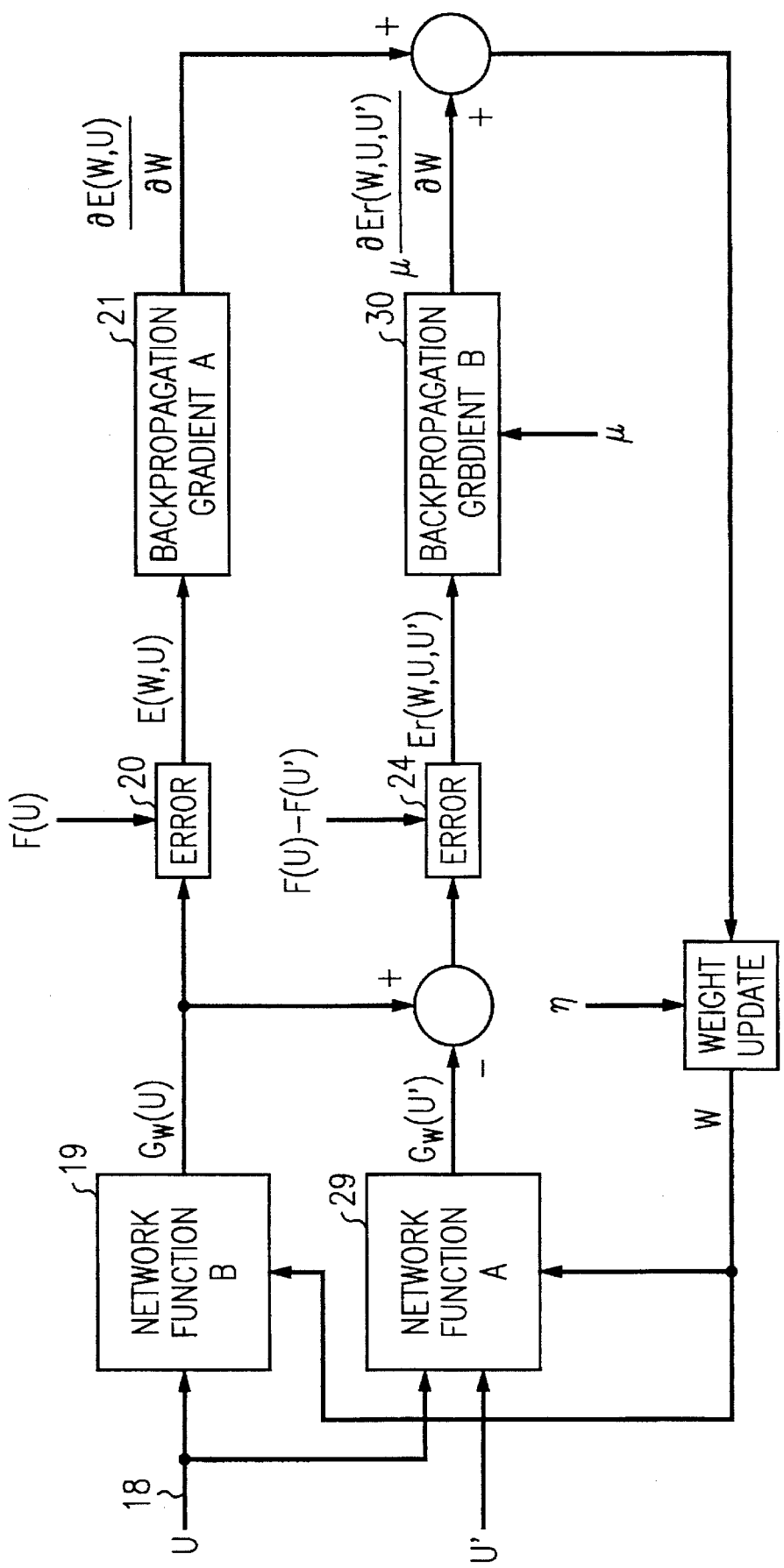

FIG. 11 illustrates a different methodology which can also be used to implement the invention. It is based on the relation between derivatives and finite differences. This second implementation of the invention is easier to realize with standard technology but has different numerical properties than the previously described methodology. As in FIG. 10, the top components 19, 20, 21 and bottom component 22 of the schematic are identical to FIG. 9 and are explained in the prior art. In the middle of FIG. 11, the first module denoted 29, network function B, is exactly identical to the module 19 immediately above, network function A; except that the parameters W of the two modules are shared. The two error modules 20, 24 are identical. The backpropagation gradient A module 21 is identical to the backpropagation module 21 of the previous figure; but the backpropagation gradient B module denoted 30 computes the gradient with respect to the two network function modules 19, 29. This computation is explained in prior art technology for networks using shared weights, such as the cited Rumelhart publication.

The algorithm of FIG. 11 takes two patterns pair $(U_p, F(U_p))$ and $(U'_p, F(U'_p))$ at each iteration. The output of the two network function modules 19, 29 is computed, followed by computing of the error, and then computing the outputs of the two gradient modules 21, 30. The parameter $\mu$ is used to control the importance given to $E_r(W, U_p, U'_p)$ relative to $E(W, U_p)$. The two weight gradients are then added and the weights are updated with an equation similar to 18. The process can be repeated by cycling several times through all the patterns, until both errors $E(W, U_p)$ and $E_r(W, U_p, U'_p)$ averaged over p reach acceptable levels.

The algorithm described above minimizes not only the difference between $F(U_p)$ and $G_w(U_p)$ as the previous technology (top 3 modules) but also the difference between $G_w(U_p) - G_w(U'_p)$ and $F(U_p) - F(U'_p)$. If $U'_p$ is set to $U_p + \epsilon T$ and $\mu$ is replaced by $\mu/\epsilon$, where $U_p$, T and $\mu$ are defined as in FIG. 10, the computations carried by FIG. 10 and 11 tend to be $$\lim_{\epsilon \to 0} \frac{G_W(U_p) - G_W(U_p + \epsilon T) - (F(U_p) - F(U_p + \epsilon T))}{\epsilon} = \quad (19)$$

$$G'_{W,T}(U_p) - F_T(U_p)$$

This method can be used in cases where the variation of F between two points U and U' is known apriori. This is less restrictive than the first method which requires knowledge of the derivative. This apparatus shown in FIG. 11 also has the advantage of being simpler to implement. The innovative character of this implementation results from using the backpropagation algorithm to minimize the error between the difference of output between two identical networks sharing the same weights.

FIGS. 9, 10, and 11 refer to the backpropagation algorithm but can easily be generalized to any gradient descent algorithm.

Figure 12:
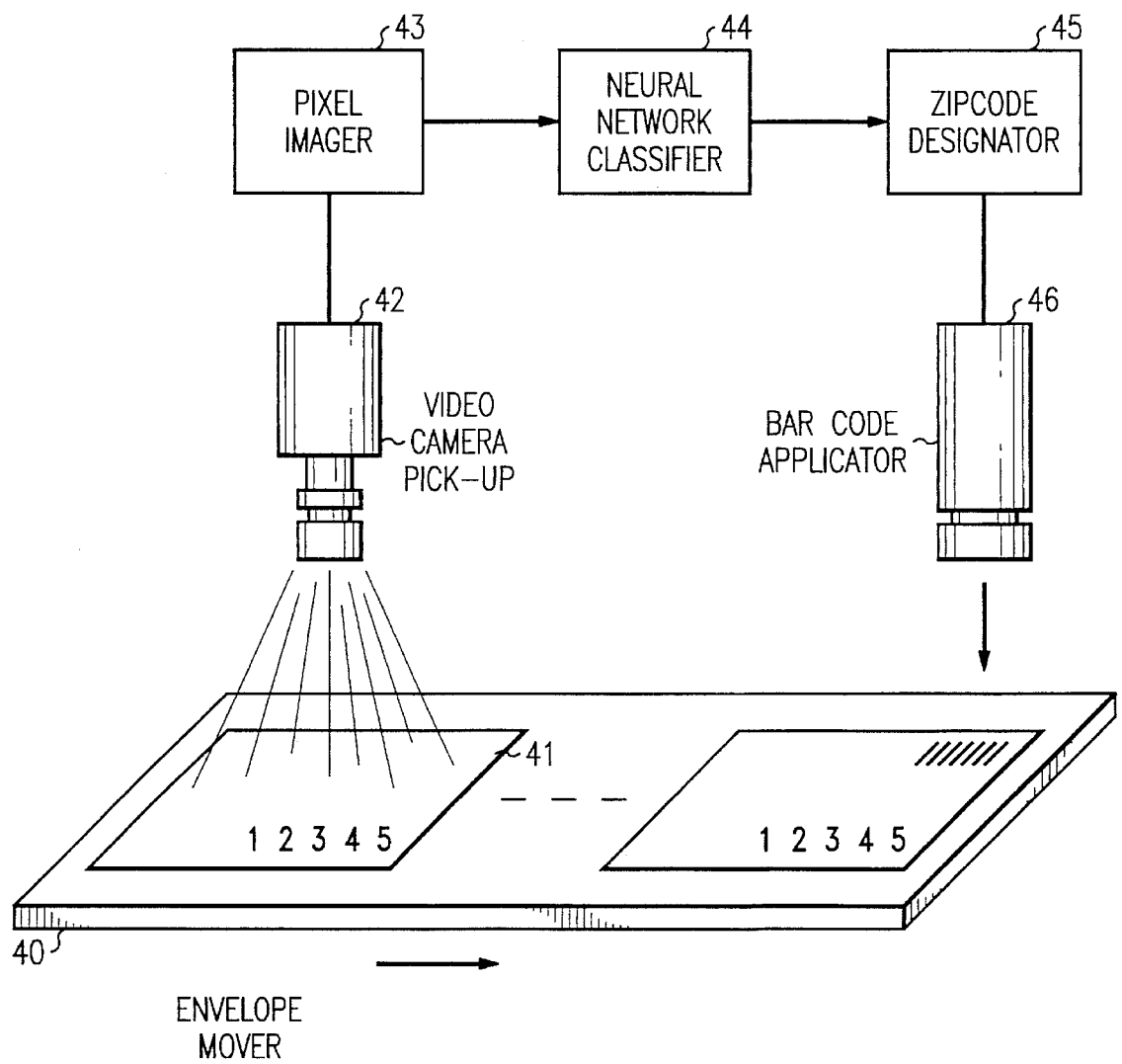
FIG. 12 is is a functional block diagram showing the use of a neural network classifier trained in accordance with the invention to read zipcodes or envelopes.

The training data input can be alphanumeric symbols, as in FIGS. 3–5, or can be speech patterns or position indicia in a robotics control system. Once a neural network is trained with particular inputs, as described with respect to FIGS. 10 or 11, then the trained neural network may be employed, for example, to read handwritten zipcode numbers. Such a system is described in FIG. 12.

An envelope mover 40 passes an envelop 41 under a video pick-up 42. The video image is converted conventionally to pixel format in the imager 43. This image, appropriately reformatted if necessary, is presented to the neural network classifier 44, which is a machine whose training has been completed as depicted in FIGS. 10 or 11. The output of classifier 44 may, for example, be a zipcode. The designation is formatted in machine-readable bar code in designator unit 45. The code then may be applied to the envelop as a bar series by application 46. Workers in the art will understand that the above-described technology is conventional except, of course, for the novelly trained neural network classifier 44.

When training a neural network to perform speech recognition, the invention can be used to make the network output invariant to speech related transformation such as changes in pitch, time scaling, time shifting, pass band filter deformation and nasalisation. Typically the input of the network is a spectrogram representing frequency versus time, which can be viewed as a two-dimensional image.

The tangent vectors for time deformations, pass band filter deformation, and pitch changes can be obtained in a similar way as for handwritten digit recognition, that is by a subtraction of a spectrogram and its transformed version followed by a division by the parameter that control the transformation. A neural network trained to be invariant with respect to these transformations would be able to recognize speech independently of such distortion of the signal and would therefore have a superiority over prior art.

When training a neural network to generate trajectories, such as for controlling a robot, the network output should reflect specific transformations of the input. Typically, the input of a network could be sensors for angle, velocity, and acceleration at the different joints of a robot arm, while the output could be controlling the torques for each of these joints. Transformation of the input resulting from a change in load, some external perturbation, or working speed, should be compensated with the appropriate changes in the controlling torques.

The tangent vectors can be computed by substracting the input and their transformed version, divided by the parameter controlling the transformation. Training the neural network to exhibit the appropriate behavior for these transformations directly from the tangent vectors, as opposed to letting the network infer the appropriate behavior from a very large data base, has advantages in both learning speed and accuracy.

Unlike in pattern recognition, where invariance of the network output with respect to the transformations is desired (i.e., the directional derivatives are set to zero in the direction of transformations), the output of a network controlling a robot can change according to the transformations. This is an example where the directional derivatives are not necessarily zero.

We claim:

1. A neural network alphanumeric pattern recognition machine comprising:

means for receiving indicia of known and unknown alphanumeric symbols;

a data base for storing received indicia of the known alphanumeric symbols and classifying each of said alphanumeric symbols according to a known class of an alphanumeric symbol, thereby to assign an alphanumeric class to each known alphanumeric symbol;

an alphanumeric pattern classifier connected to said data base for determining alphanumeric classes of unknown symbols represented by input signals to said machine;

means for training said classifier to perform a recognition function in a manner that is invariant with respect to small transformations of each said known alphanumeric symbol, said means for training comprising:

means for expressing each said known alphanumeric symbol as a vector quantity;

means for computing one or more tangent vectors from each said vector quantity, each said tangent vector being an indicia of a particular small transformation of said known symbol;

means for combining said one or more tangent vectors, thereby to derive a combined value representative of an additional alphanumeric symbol which by definition is a member of the alphanumeric class of the known alphanumeric symbol from which derived; and means for augmenting said data base with said additional alphanumeric symbols.

\* \* \* \* \*